(12) United States Patent
Katzir et al.

(10) Patent No.: US 12,518,517 B2
(45) Date of Patent: Jan. 6, 2026

(54) PERFORMANCE ESTIMATION OF MACHINE LEARNING MODELS THAT ANALYZE MEDICAL IMAGES

(71) Applicant: Aidoc Medical Ltd, Tel Aviv (IL)

(72) Inventors: Itay Katzir, Ganei Tikva (IL); Ariel Persiko, Lod (IL); Idan Bassukevitz, Givatayim (IL)

(73) Assignee: Aidoc Medical Ltd, Tel Aviv (IL)

( * ) Notice: Subject to any disclaimer, the term of this patent is extended or adjusted under 35 U.S.C. 154(b) by 333 days.

(21) Appl. No.: 18/374,103

(22) Filed: Sep. 28, 2023

(65) Prior Publication Data
US 2025/0111657 A1    Apr. 3, 2025

Related U.S. Application Data

(60) Provisional application No. 63/427,948, filed on Nov. 25, 2022.

(51) Int. Cl.
*G06K 9/00*    (2022.01)
*G06V 10/774*    (2022.01)
(Continued)

(52) U.S. Cl.
CPC .......... *G06V 10/776* (2022.01); *G06V 10/774* (2022.01); *G06V 10/945* (2022.01);
(Continued)

(58) Field of Classification Search
CPC .. G06V 10/776; G06V 10/774; G06V 10/945; G06V 2201/03; G06V 2201/10; G16H 30/40
See application file for complete search history.

(56) References Cited

U.S. PATENT DOCUMENTS 11,907,810 B2 *  2/2024  Gadelrab ............... G06N 20/00
11,928,583 B2 *  3/2024  Turgeman ................ G06N 3/09
(Continued)

OTHER PUBLICATIONS

Bustos et al. "PadChest: A Large Chest X-Ray Image Dataset With Multi-Label Annotated Reports", Medical Image Analysis, 66: 101797-1-101797-28, Published Online Apr. 20, 2020.
(Continued)

*Primary Examiner* — Xin Jia

(57) ABSTRACT

There is provided a method, comprising: feeding target metadata parameters of target medical image(s) into a performance estimation machine learning (ML) model, and obtaining a performance metric of a computer vision ML model as an outcome of the performance estimation ML model, wherein the performance estimation ML model is trained on a training dataset comprising records, wherein a record is created by feeding a sample medical image into the computer vision ML model, obtaining an outcome of the computer vision ML model, obtaining a ground truth of the sample medical image corresponding to the outcome, extracting metadata parameters associated with the sample medical image, and wherein the record includes metadata parameters associated with the sample medical image and a ground truth label comprising a performance metric of the computer vision ML model computed based on the ground truth of the sample medical image and the outcome.

23 Claims, 7 Drawing Sheets

(51) Int. Cl.
*G06V 10/776* (2022.01)
*G06V 10/94* (2022.01)
*G16H 30/40* (2018.01)

(52) U.S. Cl.
CPC ......... *G16H 30/40* (2018.01); *G06V 2201/03* (2022.01); *G06V 2201/10* (2022.01)

(56) References Cited

U.S. PATENT DOCUMENTS

2024/0412491 A1* 12/2024 Sah .................. G06N 3/045
2024/0428567 A1* 12/2024 Annangi ............ G06V 10/82

OTHER PUBLICATIONS

Casey et al. "A Systematic Review of Natural Language Processing Applied to Radiology Reports", BMC Medical Informatics and Decision Making, 21(1): 179-1-179-18, Jun. 3, 2021.

Chen et al. "Xgboost: EXtreme Gradient Boosting", R Package, Version 0.71.1, 1(4): 1-4, May 15, 2018.

Irvin et al. "CheXpert: A Large Chest Radiograph Dataset With Uncertainty Labels and Expert Comparison", AAAI'19/IAAI'19/EAAI'19: Proceedings of the Thirty-Third AAAI Conference on Artificial Intelligence and Thirty-First Innovative Applications of Artificial Intelligence Conference and Ninth AAAI Symposium on Educational Advances in Artificial Intelligence, 73: 590-597, Jan. 27, 2019.

Prokhorenkova et al. "CatBoost: Unbiased Boosting With Categorical Features", Advances in Neural Information Processing Systems, Proceedings of the 32nd International Conference on Neural Information Processing Systems, NIPS '18, Montreal, Canada, 31: 6639-6649, Dec. 3, 2018.

Thian et al. "Deep Learning Systems for Pneumothorax Detection on Chest Radiographs: A Multicenter External Validation Study", Radiology: Artificial Intelligence, 3(4): e200190-1-e200190-10, Apr. 14, 2021.

\* cited by examiner

| # | Manufacturer | filter type | Exposure Time | Collimation Width | patient sex | computer vision predictions (c) | ground truth labels (g) | specificity training labels (y) | sensitivity score | specificity score |
|---|---|---|---|---|---|---|---|---|---|---|
| 1 | GE MEDICAL SYSTEMS | HEAD FILTER | 1000 | 38.4 | M | 0 | 0 | 1 | 0.827 | 0.958 |
| 2 | GE MEDICAL SYSTEMS | MEDIUM FILTER | 912 | 20 | M | 0 | 0 | 1 | 0.830 | 0.972 |
| 3 | SIEMENS | FLAT | 1000 | 19.2 | M | 0 | 0 | 1 | 0.912 | 0.945 |
| 4 | GE MEDICAL SYSTEMS | HEAD FILTER | 800 | 20 | F | 0 | 0 | 1 | 0.849 | 0.963 |
| 5 | TOSHIBA | SMALL | 750 | 20 | F | 0 | 0 | 1 | 0.867 | 0.967 |
| 6 | GE MEDICAL SYSTEMS | HEAD FILTER | 1000 | 38.4 | M | 0 | 0 | 1 | 0.924 | 0.947 |
| 7 | GE MEDICAL SYSTEMS | HEAD FILTER | 600 | 20 | F | 0 | 0 | 1 | 0.859 | 0.956 |
| 8 | SIEMENS | FLAT | 1000 | 19.2 | F | 0 | 0 | 1 | 0.890 | 0.955 |
| 9 | TOSHIBA | MEDIUM | 750 | 20 | F | 0 | 0 | 1 | 0.809 | 0.979 |
| 10 | GE MEDICAL SYSTEMS | HEAD FILTER | 912 | 20 | V | 0 | 0 | 1 | 0.871 | 0.967 |

| # | Manufacturer | filter type | Exposure Time | Collimation Width | patient sex | compter vision predictions {c} | ground truth labels {g} | specificity training labels {y} | sensitivity score | specificity score |
|---|---|---|---|---|---|---|---|---|---|---|
| 1 | SIEMENS | FLAT | 1000 | 38.4 | M | 1 | 1 | 1 | 0.838 | 0.947 |
| 2 | GE MEDICAL SYSTEMS | MEDIUM FILTER | 1000 | 20 | M | 1 | 1 | 1 | 0.887 | 0.917 |
| 3 | Philips | UB | 1390 | 40 | M | 1 | 1 | 1 | 0.869 | 0.942 |
| 4 | GE MEDICAL SYSTEMS | MEDIUM FILTER | 900 | 20 | M | 1 | 1 | 1 | 0.912 | 0.934 |
| 5 | SIEMENS | FLAT | 500 | 38.4 | F | 1 | 1 | 1 | 0.884 | 0.911 |
| 6 | TOSHIBA | SMALL EC | 750 | 20 | M | 1 | 1 | 1 | 0.864 | 0.954 |
| 7 | SIEMENS | FLAT | 1000 | 38.4 | M | 1 | 1 | 1 | 0.891 | 0.926 |
| 8 | SIEMENS | FLAT | 1000 | 38.4 | M | 1 | 1 | 1 | 0.904 | 0.952 |
| 9 | TOSHIBA | SMALL | 750 | 20 | F | 0 | 1 | 0 | 0.843 | 0.977 |
| 10 | GE MEDICAL SYSTEMS | MEDIUM FILTER | 912 | 20 | F | 1 | 1 | 1 | 0.907 | 0.942 |

| # | Manufacturer | filter type | Exposure Time | Collimation Width | patient sex | compter vision predictions {c} | ground truth labels {g} | specificity training labels {y} | sensitivity score | specificity score |
|---|---|---|---|---|---|---|---|---|---|---|
| 1 | GE MEDICAL SYSTEMS | FLAT | 700 | 40 | F | 0 | 0 | 1 | 0.899 | 0.954 |
| 2 | GE MEDICAL SYSTEMS | MEDIUM FILTER | 1000 | 20 | M | 0 | 0 | 1 | 0.930 | 0.904 |
| 3 | GE MEDICAL SYSTEMS | UB | 900 | 20 | F | 0 | 0 | 1 | 0.909 | 0.941 |
| 4 | SIEMENS | MEDIUM FILTER | 500 | 38.4 | M | 0 | 0 | 1 | 0.918 | 0.925 |
| 5 | TOSHIBA | FLAT | 750 | 20 | M | 0 | 0 | 1 | 0.752 | 0.952 |

602

| # | Manufacturer | filter type | Exposure Time | Collimation Width | patient sex | compter vision predictions {c} | ground truth labels {g} | specificity training labels {y} | sensitivity score | specificity score |
|---|---|---|---|---|---|---|---|---|---|---|
| 1 | SIEMENS | FLAT | 1000 | 38.4 | M | 1 | 1 | 1 | 0.838 | 0.947 |
| 2 | GE MEDICAL SYSTEMS | MEDIUM FILTER | 1000 | 20 | M | 1 | 1 | 1 | 0.887 | 0.917 |
| 3 | Philips | UB | 1390 | 40 | M | 1 | 1 | 1 | 0.869 | 0.942 |
| 4 | GE MEDICAL SYSTEMS | MEDIUM FILTER | 900 | 20 | M | 1 | 1 | 1 | 0.912 | 0.934 |
| 5 | SIEMENS | FLAT | 500 | 38.4 | F | 1 | 1 | 1 | 0.884 | 0.911 |

| # | Manufacturer | filter type | Exposure Time | Collimation Width | patient sex | compter vision predictions {c} | ground truth labels {g} | specificity training labels {y} | sensitivity score | specificity score |
|---|---|---|---|---|---|---|---|---|---|---|
| 1 | GE MEDICAL SYSTEMS | HEAD FILTER | 1000 | 20 | M | 1 | 1 | 1 | 0.846 | 0.959 |
| 2 | SIEMENS | FLAT | 2000 | 5 | F | 1 | 1 | 1 | 0.910 | 0.915 |
| 3 | SIEMENS | FLAT | 1000 | 38.4 | M | 1 | 1 | 1 | 0.898 | 0.914 |
| 4 | SIEMENS | FLAT | 1000 | 19.2 | F | 1 | 1 | 1 | 0.895 | 0.958 |
| 5 | TOSHIBA | MEDIUM | 500 | 20 | F | 1 | 1 | 1 | 0.821 | 0.976 |

| # | Manufacturer | filter type | Exposure Time | Collimation Width | patient sex | compter vision predictions {c} | ground truth labels {g} | specificity training labels {y} | sensitivity score | specificity score |
|---|---|---|---|---|---|---|---|---|---|---|
| 1 | SIEMENS | FLAT | 1000 | 57.6 | F | 0 | 1 | 0 | 0.873 | 0.969 |
| 2 | TOSHIBA | MEDIUM | 750 | 20 | M | 0 | 1 | 0 | 0.838 | 0.975 |
| 3 | GE MEDICAL SYSTEMS | MEDIUM FILTER | 280 | 40 | F | 0 | 1 | 0 | 0.718 | 0.807 |
| 4 | SIEMENS | FLAT | 1000 | 57.6 | F | 0 | 1 | 0 | 0.804 | 0.953 |
| 5 | GE MEDICAL SYSTEMS | HEAD FILTER | 1316 | 20 | F | 0 | 1 | 0 | 0.780 | 0.963 |

FIG. 7

PERFORMANCE ESTIMATION OF MACHINE LEARNING MODELS THAT ANALYZE MEDICAL IMAGES

BACKGROUND

The present invention, in some embodiments thereof, relates to a machine learning models and, more specifically, but not exclusively, to performance of machine learning (ML) models that analyze medical images.

Different machine learning models (e.g., different architectures and/or trained on different training datasets) may have different performance when fed medical images. For example, one ML model may have a higher sensitivity for detecting stroke in head CT scans than a second ML model.

SUMMARY

According to a first aspect, a computer implemented method of predicting performance of a computer vision machine learning (ML) model, comprises: feeding a plurality of target metadata parameters of at least one target medical image into a performance estimation ML model, and obtaining a performance metric of a computer vision ML model as an outcome of the performance estimation ML model, wherein the performance estimation ML model is trained on a training dataset comprising a plurality of records, wherein a record is created by feeding a sample medical image into the computer vision ML model, obtaining an outcome of the computer vision ML model, obtaining a ground truth of the sample medical image corresponding to the outcome, extracting a plurality of metadata parameters associated with the sample medical image, and wherein the record includes a plurality of metadata parameters associated with the sample medical image and a ground truth label comprising a performance metric of the computer vision ML model computed based on the ground truth of the sample medical image and the outcome.

According to a second aspect, computer implemented method of training a performance estimation ML model for estimating performance of a computer vision ML model, comprising: for each medical image of a plurality of medical images: feeding the medical image into the computer vision ML model, obtaining an outcome of the computer vision ML model, obtaining a ground truth of the medical image corresponding to the outcome, and extracting a plurality of metadata parameters associated with the medical image, creating a training dataset comprising a plurality of records, wherein a record of an medical image of the plurality of medical images includes the plurality of metadata parameters and a ground truth label comprising a performance metric of the computer vision ML model computed based on the ground truth of the medical image and the outcome, and training the performance estimation ML model on the training dataset for estimating a performance of the computer vision ML model for target medical images in response to an input of a plurality of target metadata parameters.

According to a third aspect, a system for predicting performance of a computer vision machine learning (ML) model, comprising: at least one processor executing a code for: feeding a plurality of target metadata parameters of at least one target medical image into a performance estimation ML model, and obtaining a performance metric of a computer vision ML model as an outcome of the performance estimation ML model, wherein the performance estimation ML model is trained on a training dataset comprising a plurality of records, wherein a record is created by feeding a sample medical image into the computer vision ML model, obtaining an outcome of the computer vision ML model, obtaining a ground truth of the sample medical image corresponding to the outcome, extracting a plurality of metadata parameters associated with the sample medical image, and wherein the record includes a plurality of metadata parameters associated with the sample medical image and a ground truth label comprising a performance metric of the computer vision ML model computed based on the ground truth of the sample medical image and the outcome.

In a further implementation form of the first, second, and third aspects, the at least one target medical image is not fed into the performance estimation ML model, the training dataset excludes medical images, and the at least one target medical image is not fed into the computer vision ML model for predicting the performance of the computer vision ML model.

In a further implementation form of the first, second, and third aspects, the at least one target medical image associated with the plurality of target metadata parameters have not yet been captured during computation of the performance metric, and the at least one target medical image is captured after computation of the performance metric.

In a further implementation form of the first, second, and third aspects, the at least one target medical image and the sample medical image depict an interior anatomy of subjects, and are captured by a medical image device, wherein the outcome and the ground truth of the sample medical image are a visual medical finding.

In a further implementation form of the first, second, and third aspects, the metadata parameters are physical attributes of the subjects.

In a further implementation form of the first, second, and third aspects, the metadata parameters are parameters of at least one of: properties of slices of a 3D medical image, a protocol of capturing the medical images, and physical properties of the medical imaging device.

In a further implementation form of the first, second, and third aspects, the metadata parameters are selected from a group comprising: fields defined by DICOM® standard, manufacturer of medical imaging device that captured the medical image, model of medical imaging device that captured the medical image, filter type, sex of subject depicted in medical image, age of subject, race of subject, position of subject during acquisition of medical image, whether contrast was administered, and peak kilovoltage (kVp) for x-ray images.

In a further implementation form of the first, second, and third aspects, the metadata parameters are non-extractable from the medical image.

In a further implementation form of the first, second, and third aspects, the at least one target medical image comprises a plurality of medical images with different combinations of metadata parameters, wherein feeding and obtaining comprise feeding each combination of metadata parameters to obtain a respective intermediate performance metric, and further comprising computing an average of the intermediate performance metrics.

In a further implementation form of the first, second, and third aspects, the computer vision ML model is of a plurality of candidate computer vision ML models each associated with a respective corresponding performance estimation ML model, wherein the feeding and the obtaining is performed for each respective corresponding performance estimation ML model of the plurality of candidate computer vision ML models, and further comprising selecting a certain candidate computer vision ML model having a highest performance metric outcome of the respective corresponding performance estimation ML model.

In a further implementation form of the first, second, and third aspects, further comprising a plurality of performance estimation ML models each trained for predicting a different performance metric for the computer vision ML model, and further comprising obtaining an input from a user defining a tradeoff between the plurality of performance estimation ML models.

In a further implementation form of the first, second, and third aspects, the plurality of performance estimation ML models comprises a first performance estimation ML model for predicting sensitivity and a second performance estimation ML model for predicting specificity, and further comprising providing a graphical user interface (GUI) configured for enabling the user to select the tradeoff between sensitivity and specificity.

In a further implementation form of the first, second, and third aspects, further comprising computing an optimal set of metadata parameters, and selecting medical images satisfying the set for feeding into the computer vision ML model.

In a further implementation form of the first, second, and third aspects, the optimal set is found by iteratively feeding different combinations of metadata parameters into the performance estimation ML model and identifying the optimal set as a certain combination of metadata parameters having highest performance metric.

In a further implementation form of the first, second, and third aspects, further comprising applying a machine learning interpretability process to the performance estimation ML model for identifying at least one most significant metadata parameter that most contributes to the performance metric outcome, and computing values for the at least one most significant metadata parameter that generate the highest performance metric outcome.

In a further implementation form of the first, second, and third aspects, the optimal set of metadata parameters includes at least one image acquisition parameter indicating at least one of: image capture protocol, image storage parameter, and an image capture parameter of the medical imaging device, and further comprising generating instructions for adjusting the at least one image acquisition parameter for obtaining the optimal set of metadata parameters in additional images.

In a further implementation form of the first, second, and third aspects, the metadata parameters and/or records are represented as tabular data, and the performance estimation ML model is designed for processing tabular data.

In a further implementation form of the first, second, and third aspects, the performance metric comprises sensitivity.

In a further implementation form of the first, second, and third aspects, the training dataset is created by: selecting medical images having ground truth of the sample medical image indicating a positive finding depicted in the sample medical image, setting the performance metric to a value indicating highest performance when the outcome of the computer vision ML model correct identifies the positive finding, or setting the performance metric to a value indicating lowest performance when the outcome of the computer vision ML model fails to correctly identify the positive finding, wherein an average of the performance metric indicates sensitivity of the computer visional ML model for a training benchmark.

In a further implementation form of the first, second, and third aspects, the performance metric comprises specificity.

In a further implementation form of the first, second, and third aspects, the training dataset is created by: selecting medical images having ground truth of the sample medical image indicating lack of a positive finding depicted in the sample medical image, setting the performance metric to a value indicating highest performance when the outcome of the computer vision ML model correct identifies the lack of the positive finding, or setting the performance metric to a value indicating lowest performance when the outcome of the computer vision ML model fails to correctly identifies the lack of positive finding.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is a table of examples of metadata parameters for training the performance estimation ML model, as part of an experimental evaluation performed by Inventors, in accordance with some embodiments of the present invention;

FIG. 5 is a table of additional examples of metadata parameters for training the performance estimation ML model, as part of an experimental evaluation performed by Inventors, in accordance with some embodiments of the present invention;

FIG. 6 includes tables of yet additional examples of metadata parameters for training the performance estimation ML model, as part of an experimental evaluation performed by Inventors, in accordance with some embodiments of the present invention; and FIG. 7 includes tables of yet additional examples of metadata parameters for training the performance estimation ML model, as part of an experimental evaluation performed by Inventors, in accordance with some embodiments of the present invention.

DETAILED DESCRIPTION

Figure 1:
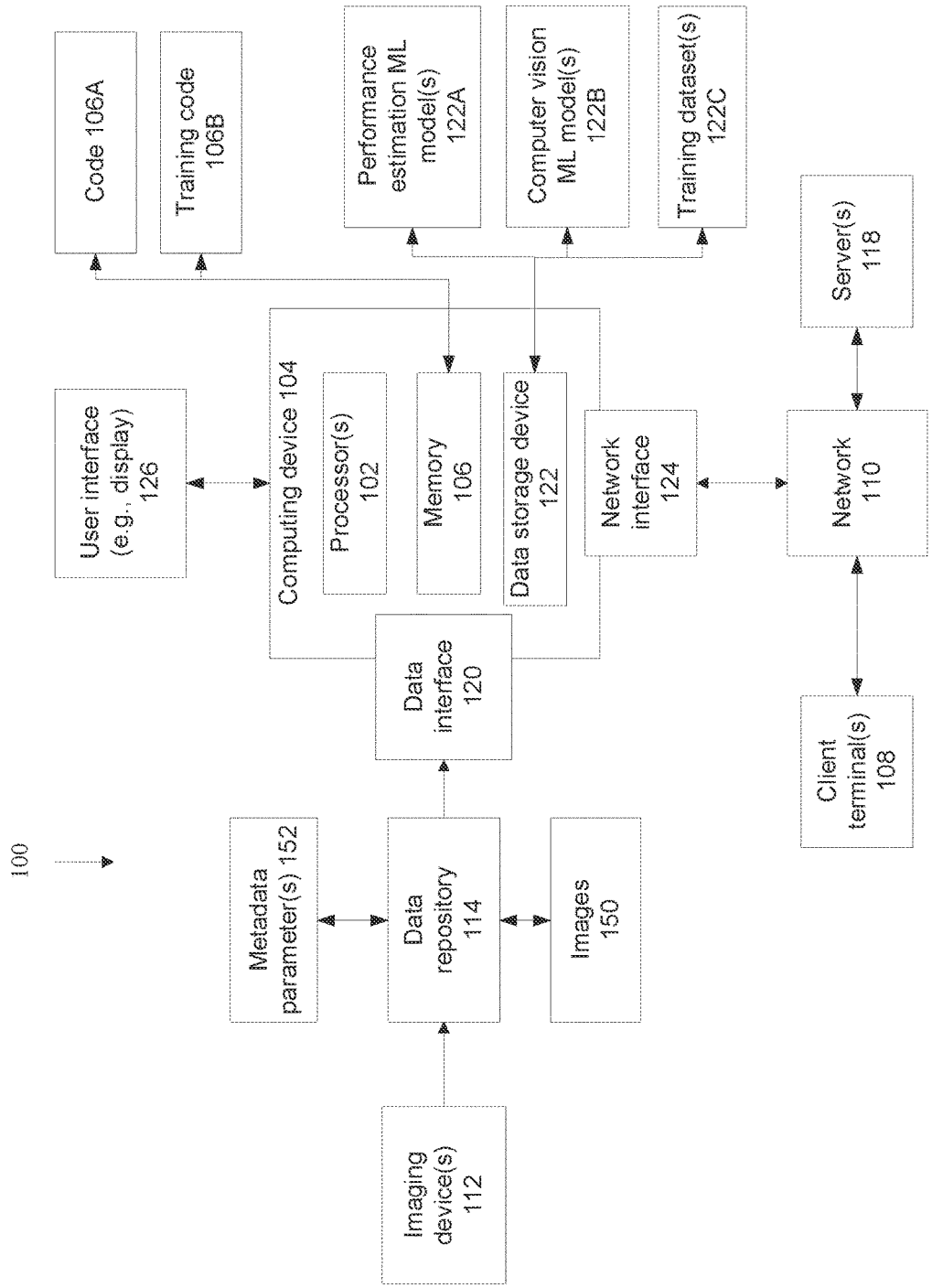
FIG. 1 is a block diagram of components of a system for predicting performance of a computer vision ML model and/or for training a performance estimation ML model, in accordance with some embodiments of the present invention.

The present invention, in some embodiments thereof, relates to a machine learning models and, more specifically, but not exclusively, to performance of machine learning (ML) models that analyze medical images.

As used herein, the term target is used with reference to metadata parameters and/or images during an inference stage. For example, target metadata parameters of target images are fed into a performance prediction ML model. The term sample is used with reference to metadata parameters and/or images during a training state. For example, sample metadata parameters of sample images are used to create records of a training dataset used to train the performance prediction ML model.

An aspect of some embodiments of the present invention relates to systems, methods, computing devices, and/or code instructions (stored on a data storage device and executable by one or more processors) for predicting performance of a computer vision ML model, for example, sensitivity and/or specificity. The performance of the computer vision ML model is predicted without necessarily measuring performance of the computer vision ML model during inference of medical images. The performance of the computer vision ML model for inference of medical images may be predicted without using the medical images, for example, when the medical images are not available, such as when the medical images have not yet been captured. A processor feeds multiple target metadata parameters of one or more target images into a performance estimation ML model. The target images are not fed into the performance estimation ML model. The target metadata parameters are not images. The target metadata parameters may be, for example, values of fields, categories, labels. For example, the target metadata parameters may be parameters of a CT scanner (e.g., filter type, exposure time, x ray tube current, manufacturer), attributes of the subject depicted in the medical image (e.g., sex, position during acquisition), and/or metadata defined by the DICOM® standard. It is noted that the target images may not yet exist, for example, the target images which correspond to the metadata parameters have not yet been captured, or are captured but can't be used for performance estimation such as due to security and/or privacy concerns. The processor obtains a performance metric of the computer vision ML model as an outcome of the performance estimation ML model. The performance metric indicates a prediction of performance of the computer vision ML model fed the target medical images corresponding to the metadata parameters.

An aspect of some embodiments of the present invention relates to systems, methods, computing devices, and/or code instructions (stored on a data storage device and executable by one or more processors) for training a performance estimation ML model for estimating performance of a computer vision ML model. For each sample medical image of multiple sample medical images: A processor feeds the sample image into the computer vision ML model. The processor obtains an outcome of the computer vision ML model, for example, a classification category, such as whether a certain clinical finding is present or not in the sample image. The processor obtains a ground truth of the sample image corresponding to the outcome, for example, by performing natural language processing (NLP) on radiology reports to determine whether the radiologist saw the certain clinical finding or not, and/or manual annotation by experts. Multiple metadata parameters associated with the sample image are extracted, for example, from the imaging machine, from the DICOM® file, from the electronic health record (EHR) of the subject depicting in the sample medical image, and the like. The processor creates a training dataset of multiple records. A record may be based on a sample image. The record includes the metadata parameters, and a ground truth label of a performance metric of the computer vision ML computer computed based on the ground truth of the sample image (e.g., obtained via NLP) and the outcome generated by the computer vision ML model. The record may exclude the sample image itself. The training dataset may exclude sample images. The processor trains the performance estimation ML model on the training dataset. The training of the performance estimation ML model may done without any of the sample images. In some embodiments, dual training sessions are performed, one training session to estimate sensitivity and another training session to estimate specificity.

At least some implementations of the systems, methods, computing devices, and/or code instructions (stored on a data storage device and executable by one or more processors) described herein address the technical problem of estimating performance of a computer vision ML model that processes medical images. At least some implementations of the systems, methods, computing devices, and/or code instructions described herein improve the technology of ML models, by training a performance estimation ML model that estimates performance of the computer vision ML model. At least some implementations of the systems, methods, computing devices, and/or code instructions described herein improve upon prior approaches for measuring performance of the computer vision ML model.

One of the main problems deploying ML models at scale is variability of images which often leads to performance variability. For example, CT images captured at different hospitals may lead to different performance when fed into the same computer vision ML model. Even for the same site, data drift may occur over time, where the performance of the same computer vision ML model changes over time.

The performance of a certain computer vision ML model (e.g., for a new site) and/or the performance drift of the certain computer vision ML model (e.g., for an existing site) over time may be significant for new deployments and/or for monitoring old deployments.

Using existing approaches, direct measurements of performance of the computer vision ML model are performed. For example, a representative benchmark is created. Preferably, it is anonymized. Then it is annotated (e.g., manually or using NLP analysis of medical records). Images are fed into the computer vision ML model. Based on the inference results, performance is measured. This process uses significant computations resources for inference by the computer vision ML model (e.g., processor utilization, processing time, memory requirements), is costly due to the human resources requiring to run it, and/or is time consuming. Moreover, performance cannot be measured unless images are available. Performance cannot be accurately predicted for future sites where no images have yet been captured.

At least some implementations of the systems, methods, computing devices, and/or code instructions described herein improve solve the aforementioned technical problem, and/or improve the aforementioned technology, and/or improve upon the aforementioned prior approaches, by training a performance estimation ML model for estimating performance of a computer vision ML model in response to an input of multiple metadata parameters of images. The performance estimation ML model estimates the performance using the metadata parameters of the images without feeding the images themselves into the computer vision ML model. Estimating performance using metadata parameters without feeding the images themselves into the computer vision ML model has multiple potential advantages:

Obtains estimated performance without requiring access to the images themselves. For example, using the metadata parameters performance is estimated before images are available. This allows predicting performance for future deployments of the computer vision ML model at new sites, before images are available at the new site.

Improved utilization of processing resources that execute the computer vision ML model, since the computer vision ML model itself is not executed for inference of images to measure performance. Rather, the performance estimation ML model, which may be fed text and/or tabular data is executed, which uses fewer computational resources.

Ability to select optimal metadata parameters to obtain optimal performance of the computer vision ML model. For example, optimal scan parameters of a CT scanner (e.g., protocols, filter type, exposure time, x ray tube current . . . ) may be selected to obtain optimal performance of the computer vision ML model into which the CT scans are fed.

For example, a special series may be generated for each CT study which is optimized for inference by a specific computer vision ML model. Different metadata parameters may be tested using the performance estimation ML model, and/or ML interpretability approaches may be used to identify the most important metadata parameters that affect performance of the computer vision ML model. The optimal metadata parameters of the images may be selected without reducing access to the images themselves, and/or may be identified easily without requiring capturing different images with different metadata parameters.

Significant improvements both in deployment of new systems and in monitoring existing ones.

Ability to estimate and monitor performance in the absence of annotated data (in inference).

Ability to estimate and monitor performance in the absence of annotated data (in inference). For example, performance may be predicted using a small set of metadata parameters which may be for a small set of images.

Faster response time to data drifts relative to standard approaches.

Acts as independent validation to measurements made using standard approaches when both are available.

Ability to perform unbiased comparison between different ML systems (e.g., by comparing the different ML systems under conditions optimal to respective specific requirements.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
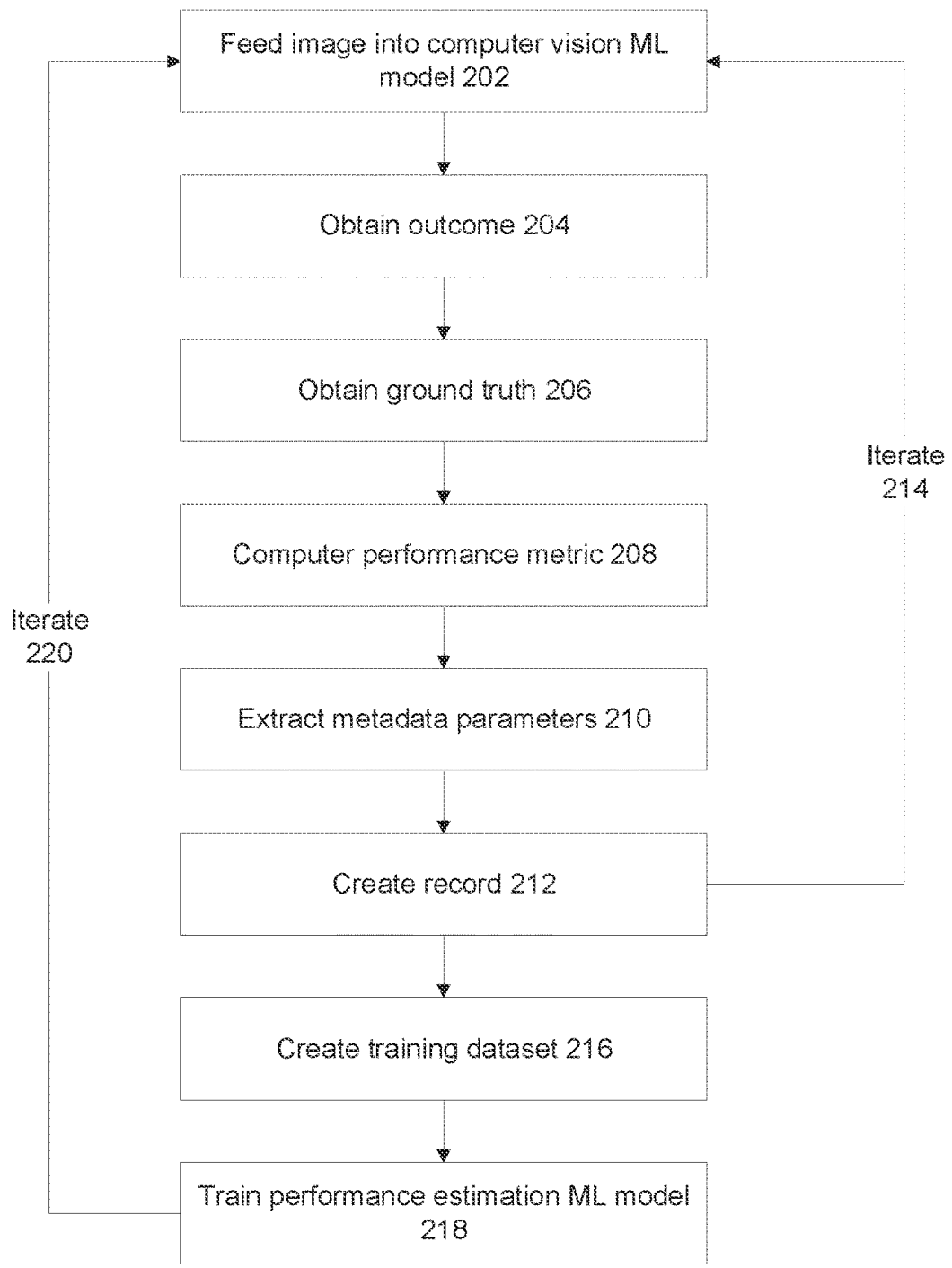
FIG. 2 is a flowchart of a method of training a performance estimation ML model, in accordance with some embodiments of the present invention.
Figure 3:
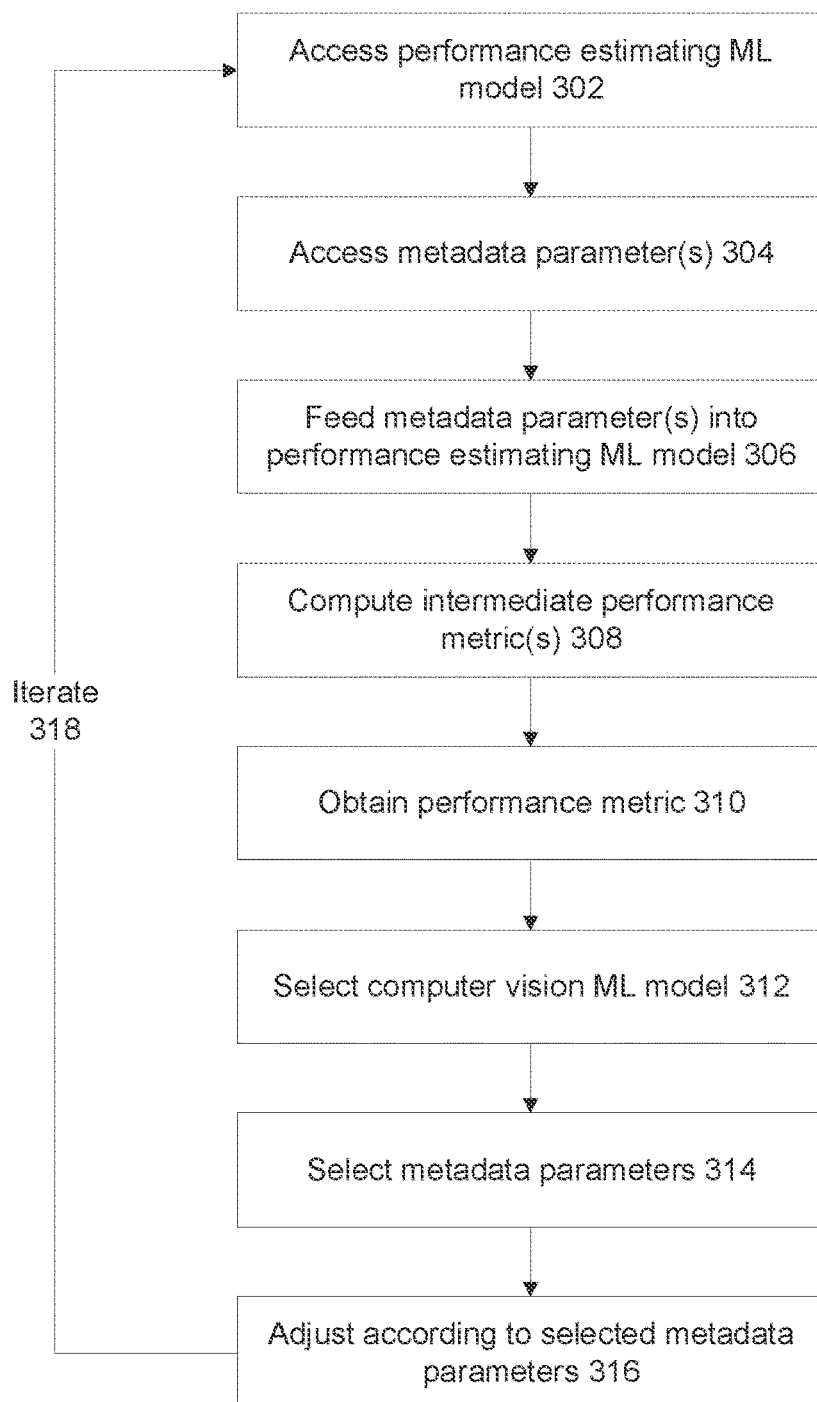
FIG. 3 is a flowchart of a method of predicting performance of a computer vision ML model, in accordance with some embodiments of the present invention.

Reference is now made to FIG. 1, which is a block diagram of components of a system for predicting performance of a computer vision ML model and/or for training a performance estimation ML model, in accordance with some embodiments of the present invention. Reference is also made to FIG. 2, which is a flowchart of a method of training a performance estimation ML model, in accordance with some embodiments of the present invention. Reference is also made to FIG. 3, which is a flowchart of a method of predicting performance of a computer vision ML model, in accordance with some embodiments of the present invention. Reference is also made to FIG. 4, which is a table 402 of examples of metadata parameters for training the performance estimation ML model, as part of an experimental evaluation performed by Inventors, in accordance with some embodiments of the present invention. Reference is also made to FIG. 5, which is a table 502 of additional examples of metadata parameters for training the performance estimation ML model, as part of an experimental evaluation performed by Inventors, in accordance with some embodiments of the present invention. Reference is also made to FIG. 6, which includes tables 602 and 604 of yet additional examples of metadata parameters for training the performance estimation ML model, as part of an experimental evaluation performed by Inventors, in accordance with some embodiments of the present invention. Reference is also made to FIG. 7, which includes tables 702 and 704 of yet additional examples of metadata parameters for training the performance estimation ML model, as part of an experimental evaluation performed by Inventors, in accordance with some embodiments of the present invention.

System 100 may implement the acts of the method described with reference to FIGS. 2-3, optionally by a hardware processor(s) 102 of a computing device 104 executing code instructions stored in a memory 106.

Computing device 104 may be implemented as, for example, a client terminal, a server, a virtual server, a radiology workstation, a virtual machine, a computing cloud, a mobile device, a desktop computer, a thin client, a Smartphone, a Tablet computer, a laptop computer, a wearable computer, glasses computer, and a watch computer. Computing 104 may include an advanced visualization process that sometimes is add-on to a radiology workstation, for example, for presenting the estimated performance of one or more computer vision ML models that analyze medical images.

Computing device 104 may include locally stored software that performs one or more of the acts described with reference to FIGS. 2-3, and/or may act as one or more servers (e.g., network server, web server, a computing cloud, virtual server) that provides services (e.g., one or more of the acts described with reference to FIGS. 2-3) to one or more client terminals 108 (e.g., remotely radiology workstations, remote picture archiving and communication system (PACS) servers, remote electronic medical record (EMR) servers) over a network 110, for example, providing software as a service (SaaS) to the client terminal(s) 108, providing an application for local download to the client terminal(s) 108, as an add-on to a web browser and/or a medical imaging viewer application, and/or providing functions using a remote access session to the client terminals 108, such as through a web browser.

Different architectures based on system 100 may be implemented.

In one example, computing device 104 provides centralized services. Computing device 104 may perform training of one or more performance estimation ML models 122A that estimate performance of one or more computer vision ML models 122B, as described herein. Computing device 104 may generate one or more training datasets 122C by creating ground truth of records by measuring performance of computer vision ML models 122B fed images 150 captured by imaging device(s) 112 and/or using metadata 152 of images 150, as described herein. Computing device 104 may feed metadata 152 into the trained performance estimation ML model(s) 122A to obtain an estimated performance of computer vision ML model(s) 122B, as described herein. Alternatively, training of performance estimation ML models 122A is performed by another computing device, and inference using performance estimation ML models 122A for estimating performance of computer vision ML model(s) 122B is centrally performed by computing device 104. Locally obtained metadata parameters 152 of images 150 may be provided to computing device 104 for centralized inference by the trained performance estimation ML model(s) 122A to obtain estimated performance of computer vision ML model(s) 122B without requiring feeding of the images into the computer vision ML model(s) 122B. Metadata may be provided to computing device 104, for example, via an API, a local application, via a PACS server, and/or transmitted using a suitable transmission protocol. The outcome of the estimated performance of computer vision ML model(s) 122B may be provided, for example, to client terminal(s) 108 for presentation on a display and/or local storage, feeding into another process, and/or stored by computing device 104. In another example, computing device 104 provides centralized training of the performance estimation ML model(s) 122A, using images 150, metadata 152 and/or measured performance of computer vision ML model(s) 122B of records of or more training datasets 122C. The data for the records may be provided by different client terminals 108 and/or servers 118. For example, training records may originate from different hospitals to create a centralized large and/or diverse training dataset. In another example, training datasets may be for different imaging modalities (e.g., MRI, 3D mammogram) and/or for different architectures of computer vision ML model(s) 122, for creating the centralized large and/or diverse training dataset. Alternatively or additionally, different more specific training datasets may be created, for example, per site, per imaging modality, and/or per ML model architecture. Respective generated performance estimation ML models 122A may be provided to the corresponding remote devices (e.g., client terminal(s) 108 and/or server(s) 118) for local use. For example, each hospital uses the performance estimation ML model created from their own training dataset for evaluation of performance of computer vision ML model(s) 122B according to metadata of images captured at the respective hospital.

In another example, computing device 104 provides localized services. For example, computing device 104 includes code locally stored and/or locally executed by a radiology workstation, and/or client running a radiology image viewing program. The code may be a plug-in and/or add-on to the radiology image viewing program, to provide additional features of estimating performance of one or more computer vision ML model(s) 122B that analyze images 150 captured by imaging device(s) 122. Computing device 104 may locally train performance estimation ML model(s) 122A using training dataset(s) 122C that include metadata 152 of images 150 captured by a local imaging device 112, and a ground truth of performance of computer vision ML model(s) 122B evaluating images 150. In another example, computing device 104 obtains trained performance estimation ML model(s) 122A from another device. Computing device 104 feeds metadata 152 into performance estimation ML model(s) 122A for obtaining an estimated performance of computer vision ML model(s) 122B, as described herein. The outcomes of the analysis may be presented on a display (e.g., user interface 126) of computing device 104, locally stored, sent to another device for storage (e.g., PACS server), and/or fed into another application (e.g., automated deployment of computer vision ML model(s)).

Imaging device 112 captures and provides the images 150, which may be used to generate training dataset(s) 122C, as described herein. Examples of imaging device 112 include: a magnetic resonance imaging (MRI)), CT scanner, ultrasound machine, mammogram, PET scanner and x-ray machine.

Training dataset(s) 122C may be stored in a data repository 114 and/or data storage device 122, for example, a storage server, a computing cloud, virtual memory, and a hard disk. Training dataset(s) 122C are used to train the performance estimation ML model(s) 122A, as described herein. It is noted that training dataset(s) 122C may be stored by a server 118, accessibly by computing device 104 over network 110.

Computing device 104 may receive metadata 152 (for inclusion in training dataset(s) 122C and/or for inference) using one or more data interfaces 120, for example, a wire connection (e.g., physical port), a wireless connection (e.g., antenna), a local bus, a port for connection of a data storage device, a network interface card, other physical interface implementations, and/or virtual interfaces (e.g., software interface, virtual private network (VPN) connection, application programming interface (API), software development kit (SDK)). Computing device 104 may obtain images 150, which may be fed into computer vision ML model(s) 122B to obtain ground truths for records of training dataset(s) 122C, using data interface(s) 120.

Metadata 152 may be obtained, for example, from metadata of images 150, from medical records of the patients (e.g., stored in electronic health records (HER), which may be hosted by a EHR server), and/or from a PACS server.

Hardware processor(s) 102 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include one or more processors (homogenous or heterogeneous), which may be arranged for parallel processing, as clusters and/or as one or more multi core processing units.

Memory 106 (also referred to herein as a program store, and/or data storage device) stores code instruction for execution by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). For example, memory 106 may store image processing code 106A that implement one or more acts and/or features of the method described with reference to FIGS. 2-3 and/or training code 106B that trains one or more of the performance estimation ML models 122A, as described herein.

Computing device 104 may include a data storage device 122 for storing data, for example, one or more trained performance estimation ML models 122A, one or more computer vision ML model(s) 122B, and/or one or more training datasets 122C as described herein. Data storage device 122 may be implemented as, for example, a memory, a local hard-drive, a removable storage device, an optical disk, a storage device, and/or as a remote server and/or computing cloud (e.g., accessed over network 110). It is noted that 122A-C may be stored in data storage device 122, with executing portions loaded into memory 106 for execution by processor(s) 102.

Computer vision ML models 112B described herein may be implanted using a suitable architecture designed to process images, for example, one or more neural networks of various architectures (e.g., detector, convolutional, fully connected, deep, U-net, encoder-decoder, and combination of multiple architectures).

Computing device 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 104 may access one or more remote servers 118 using network 110, for example, to obtain and/or provide metadata 152, an updated version of code 106A, training code 106B, computer vision ML model(s) 122B, and/or the trained performance estimation ML model(s) 122A.

It is noted that data interface 120 and network interface 124 may exist as two independent interfaces (e.g., two network ports), as two virtual interfaces on a common physical interface (e.g., virtual networks on a common network port), and/or integrated into a single interface (e.g., network interface). Computing device 104 may communicate using network 110 (or another communication channel, such as through a direct link (e.g., cable, wireless) and/or indirect link (e.g., via an intermediary computing device such as a server, and/or via a storage device) with one or more of:

- Client terminal(s) 108, for example, when computing device 104 acts as a server providing services (e.g., SaaS) for estimating performance of computer vision ML model(s) 122B to remote radiology terminals according to a set of metadata 152 parameters, using the trained performance estimation ML model(s) 122A.
- Server 118, for example, implemented in association with a PACS, which may store metadata 152 of images 150 which is fed into performance estimation ML model(s) 122A and/or used for generating training dataset(s) 122C and/or may store captured images 150.
- Imaging device 112 and/or data repository 114 that store images 150 acquired by imaging device 112. The acquired images may be fed into computer vision ML model(s) 122B for obtaining ground truth for training dataset(s) 122C.
- One or more devices hosting metadata parameters 152, for example, PACS server, EHR server, and the like.

Computing device 104 and/or client terminal(s) 108 and/or server(s) 118 include and/or are in communication with a user interface(s) 126 that includes a mechanism designed for a user to enter data (e.g., select computer vision ML model 122B) and/or view the estimated performance determined by performance estimation ML model(s) 122A. Exemplary user interfaces 126 include, for example, one or more of, a touchscreen, a display, a keyboard, a mouse, and voice activated software using speakers and microphone.

Referring now back to FIG. 2, at 202, the processor feeds a sample medical image into the computer vision ML model.

The sample medical image is captured by a medical image device, for example, MRI, CT scanner, x-ray machine, ultrasound machine, PET scanner, and the like. The medical images may be a 2D, 3D, and/or 4D image.

The medical image depicts a subject. The medical image depicts a certain region of the body, for example, head, chest, abdomen, whole body, and the like.

The computer vision ML model may be trained to detect one or more visual features depicted in the medical image, for example, clinical findings, such as intracerebral hemorrhage, fatty liver, pneumothorax, and bone fracture. The computer vision ML model may be used, for example, as screening tool for prioritizing medical images for review by a radiologist, and/or a second automated reviewer for assisting a radiologist in reviewing the medical images.

The computer vision ML model may be implemented as, for example, a neural network and/or other model designed to process medical images.

The computer vision ML model may be implemented as a binary classifier, for example, that generates an outcome of whether a certain visual feature is found in the medical image, or not found in the medical image. The computer vision ML model may be implemented as other architectures, for example, a multi-category classifier, a detector, a segmentation model, and the like.

At 204, the processor obtains an outcome of the computer vision ML model in response to the input of the sample medical image.

The outcome may be, for example, an indication of whether a certain visual medical feature is found in the image or not found, a classification category, a segmented region, and the like.

At 206, the processor accesses a ground truth of the sample image corresponding to the outcome.

The ground truth may be obtained, for example, by NLP analysis of reports such as analyzing a radiology report to extract findings that the radiologists saw in the image, manual labels, and/or extraction of data from an electronic health record of the subject (e.g., medical diagnosis, such as if subject is diagnosed with an intracerebral hemorrhage, it can be assumed that the intracerebral hemorrhage is visible on images of the brain).

At 208, a performance metric of the computer vision ML model computed based on the ground truth of the sample image and the outcome.

The performance metric may be, for example, a binary value indicating whether the computer vision ML model correctly generated the outcome that matches the ground truth, or did not generate a correct outcome since the generated outcome does not match the ground truth. In another example, the performance metric may be a distance between the outcome of the computer vision ML model and the ground truth, such as a Euclidean distance, a value of a correlation value that computes correlation between the outcome of the computer vision ML model and the ground truth, and/or other statistical distance such as a distance between a segmented region outcome of the computer vision ML model and the segmented ground truth region.

Optionally, the performance metric is sensitivity. To generate the records of the training dataset for training the performance estimation ML model to predict sensitivity of the computer vision ML model, sample images where the ground truth of the sample image indicates a positive finding depicted in the sample image, are selected. I.e., in sample images fed into the computer vision ML model for detecting intracerebral hemorrhage, the sample images that actually do depict intracerebral hemorrhage (i.e., the ground truth indicates that the sample images depict intracerebral hemorrhage), are selected. The performance metric is set to a value indicating highest performance when the outcome of the computer vision ML model correctly identifies the positive finding, for example, to a value of 1. The performance metric is set to a value indicating lowest performance when the outcome of the computer vision ML model fails to correctly identify the positive finding, for example, to a value of zero. An average of the performance metric indicates sensitivity of the computer visional ML model for a training benchmark.

Alternatively or additionally, the performance metric is specificity. In some embodiments, both specificity and sensitivity are used are performance metrics. To generate the records of the training dataset for training the performance estimation ML model to predict specificity of the computer vision ML model, sample images where the ground truth of the sample image indicates a lack of a positive finding depicted in the sample image, are selected. I.e., in sample images fed into the computer vision ML model for detecting intracerebral hemorrhage, the sample images that do not depict intracerebral hemorrhage (i.e., the ground truth does not indicate that the sample images depict intracerebral hemorrhage), are selected. The performance metric is set to a value indicating highest performance when the outcome of the computer vision ML model correctly identifies the lack of the positive finding, for example, to a value of 1. The performance metric is set to a value indicating lowest performance when the outcome of the computer vision ML model fails to correctly identifies the lack of positive finding, for example to a value of zero.

At 210, the processor extracts and/or accesses multiple metadata parameters associated with the sample image.

Optionally, the metadata parameters are physical attributes of the subject depicted in the image, for example, sex, age, weight, race, body part depicted in the image (e.g., head, chest, abdomen), pose of patient (e.g., anterior-posterior, lateral), and the like. The metadata parameters may be obtained, for example, from the electronic health record of the subject, manually entered by a user, automatically obtained by analyzing visual images of the subject captured by a standard camera (e.g., a video camera located in the room where the medical imaging device is capturing the image), and/or obtained from other sensors performing measurements (e.g., scale weighing the subject, blood pressure cuff measuring blood pressure of the subject).

Alternatively or additionally, the metadata parameters are values extracted from metadata associated with the medical image defined by a standard such as DICOM®.

Alternatively or additionally, the metadata parameters are settings associated with the image capture process, which may be adjustable. The metadata parameters may be obtained, for example, from the imaging device, from a control station used by an administrator to configure the imaging device, and/or metadata of the image. Examples of such metadata parameters include: properties of slices of a 3D medical image such as exposure time, a protocol of capturing the medical images, physical properties of the medical imaging device, manufacturer of the medical imaging device, model of the medical imaging device, filter type, and peak kilovoltage (kVp) for x-ray images.

The metadata parameters may be represented, for example, as text, numbers, and/or categories. The metadata parameters may be implemented as tabular data.

The metadata parameters may be non-extractable from the image itself. For example, image processing code and/or a neural network cannot extract the metadata parameters. The metadata parameters may exclude features of the image itself, for example, pixel intensity values, detected edges, and the like.

At 212, the processor may create a record. The record includes the metadata parameters associated with the sample image, and a ground truth label of the performance metric of the computer vision ML model.

The record may exclude the sample image.

At 214, features described with reference to 202-212 may be iterated, for creating multiple records.

At 216, a training dataset that includes the multiple records is created.

At 218, the performance estimation ML model is trained on the training dataset.

The performance estimation ML model may be trained on the training dataset for estimating a performance of the computer vision ML model for target image(s) in response to an input of the target metadata parameters associated with the target image(s).

When the metadata parameters and/or records are represented as tabular data, the performance estimation ML model may be designed for an input of tabular data and/or for processing tabular data. The architecture of the performance may be selected for the input of tabular data and/or for processing tabular data, for example, random forest based approaches.

At 220, features described with reference to 202-218 may be iterated for training multiple performance estimation ML models. For example, different performance estimation ML models may be trained for different performance metrics such as a single performance estimation ML model per performance metric (e.g., sensitivity, specificity), for different combinations of metadata parameters, and the like.

Referring now back to FIG. 3, at 302, the processor accesses one or more performance estimation ML models. An exemplary approach for training performance estimation ML model(s) is described with reference to FIG. 2.

At 304, the processor accesses and/or extracts metadata parameters.

The metadata parameters that are obtained correspond to the metadata parameters used to train the performance estimation ML model. Exemplary metadata parameters are described, for example, with reference to 210 of FIG. 2.

The metadata parameters are associated with one or multiple target images. The target image may have already been acquired. Alternatively or additionally the target images may not yet have been acquired, in which case the metadata parameters indicate properties of the future target images to be acquired, for example, the settings of the imaging machine that will acquire the future target images, and/or the patients to select for the future target images.

At 306, the target metadata parameters are fed into the performance estimation ML model.

The target image(s) corresponding to the target metadata parameters are not fed into the performance estimation ML model for predicting the performance of the computer vision ML model.

The target image(s) corresponding to the target metadata parameters are not necessarily fed into the computer vision ML model for predicting the performance of the computer vision ML model.

At 308, there may be multiple target images with different combinations of metadata parameters, for which performance of the computer vision ML model in analyzing the multiple target images is being obtained. For example, for a set of 500 images, there may be 200 images captured by a CT scanner of one manufacturer, and 300 images captured by a CT scanner of another manufacturer. In another example, for the set of 500 images, there may be 150 images captured with one filter type, and 350 images captured with another filter type.

In cases where there are multiple target images with different combinations of metadata parameters, each combination of metadata parameters may be fed into the performance estimation ML model (e.g., by iterating features described with reference to 306) to obtain a respective intermediate performance metric.

Multiple intermediate performance metrics are obtained as the outcome for each combination.

At 310, the processor obtain a performance metric of the computer vision ML model as an outcome of the performance estimation ML model. The performance metric may be, for example, sensitivity and/or specificity.

Optionally, in cases where multiple intermediate performance metrics are obtained as outcomes for multiple combinations of metadata parameters, the performance metric is computed by aggregating the multiple intermediate performance metrics. For example, the performance metric is computed as an average of the intermediate performance metrics, optionally a weighted average. For example, for the case of 500 images, the performance metric is computed as the weighted average of a first intermediate performance metric for the 200 images captured by the CT scanner of the first manufacturer, and a second intermediate performance metric determined for the 300 images captured by the CT scanner of the second manufacturer.

Alternatively or additionally, multiple performance metrics are obtained from multiple different performance estimation ML models fed the same set of metadata parameters. Each performance estimation ML model may be trained to generate a different type of performance metric for the computer vision ML model. For example, sensitivity of the computer vision ML model is obtained from one performance estimation ML model, and specificity of the computer vision ML model is obtained from another performance estimation ML model.

Optionally, at 312, there may be multiple candidate computer vision ML models, for example, having different architectures (e.g., different neural network architecture) and/or trained on different training datasets and/or trained using different approaches (e.g., having undergone different pre-processing). Each of the candidate computer vision ML models may be associated with a respective corresponding performance estimation ML model. Each respective performance estimation ML model generates an outcome of the performance metric for the corresponding candidate computer vision ML model, optionally for the same set of metadata parameters. The same set of metadata parameters may be fed into each performance estimation ML model (e.g., as described with reference to 306) to obtain the respective performance metric for each respective computer vision ML model (e.g., as described with reference to 310). A certain candidate computer vision ML model may be selected according to the highest predicted performance metric generated by the corresponding performance estimation ML model.

At 314, a set of metadata parameters (also referred to as an optimal set) may be selected for target images which are to be analyzed by the computer vision ML model.

The optimal set of metadata parameters that are selected may include parameters that may be controlled and/or selected for future target images and/or for existing target image, for example, image capture protocol (e.g., patient position, contrast administration), image storage parameter, and an image capture parameter of the medical imaging device (e.g., filter type, exposure time).

The target images satisfying the selected set of metadata parameters may be selected feeding into the computer vision ML model. Alternatively or additionally, the target images are captured according to the selected set of metadata parameters, for example, as described with reference to 316.

Optionally, the set of metadata parameters represents an optimal (or near optimal, or best attempt to obtain the optimal) set of metadata parameters selected to obtain a higher performance of the computer vision ML model.

Optionally, the set of metadata parameters is selected as a tradeoff between two (or more) performance metrics, for example, as a tradeoff between sensitivity and specificity. The optimal tradeoff between the performance parameters may be selected for a user. An interface, optionally a graphical user interface (GUI) may be designed to enable a user to select different combinations of sensitivity and specificity of the computer vision ML Model for different sets of metadata parameters. For example, the GUI includes a two dimensional axis, with sensitivity on one axis and specificity on another axis. The user may click and/or drag a cursor along values of one axis, where the value of the other axis is dynamically computed.

Different approaches may be used for selecting the set of metadata parameters (e.g., the optimal set):

In one exemplary approach, the optimal set is found by iteratively feeding different combinations of metadata parameters into the performance estimation ML model. The optimal set is identified as a certain combination of metadata parameters having highest performance metric. The different combinations of metadata parameters fed into the performance estimation ML model may be selected, for example, randomly, and/or using heuristics (e.g., determining whether certain metadata parameters increase or decrease performance, and adjusting the metadata parameters accordingly.)

In another exemplary approach, the optimal set is found by applying a machine learning interpretability process to the performance estimation ML model. Examples of ML interpretability processes include local surrogate (LIME), shapley additive explanations (SHAP), and the like. One or more most significant metadata parameter that most contribute to the performance metric outcome generated by the performance estimation ML model may be identified by analyzing the applied ML interpretability process. Values for the identified most significant metadata parameter(s) are computed for generating the highest performance metric outcome.

At 316, adjustment may be made according to the selected set of optimal metadata parameters, in an attempt to achieve the highest performance of the computer vision ML model that analyzes the target images satisfying the optimal metadata parameters. For example, image acquisition parameters are adjusted to the optimal set of metadata parameters in further target images, to obtain the predicted highest performance of the computer vision ML model that analyzes the target images. For example filter type, exposure time, x ray tube current are selected according to the optimal set of metadata parameters.

At 318, one or more features described with reference to 302-316 may be iterated, for example, for dynamic monitoring of drifts in performance of computer vision ML models, dynamic selection of metadata parameters for maintaining high performance of the drifts in performance of the computer vision ML models, and/or for dynamic adaptation of image acquisition parameters in view of drift in performance the computer vision ML models for maintaining high performance of the computer vision ML models.

Mathematical expressions for training the performance estimation ML models for sensitivity and/or specificity, based on embodiments described herein, are provided.

The training set includes annotated medical images denoted $\{s\}_i$ with ground-truth labels denoted $\{g_i\}$. The predictions of the computer vision ML model are denoted $\{c_i\}$. The metadata parameters are denoted $\{X_i\}$.

For training the performance estimation ML model for estimating sensitivity of the computer vision ML model, $g_i=1$ examples are used during training (i.e., other examples such as $g_i=0$ examples are excluded). The labels denoted $\{y_i\}$ are defined to be: $y_i=1$ if $c_i=1$, and $y_i=0$ otherwise. A property of this definition is that averaging on the labels $\{y_i\}$ gives sensitivity of the computer vision ML model for the training benchmark.

The performance estimation ML model is trained to predict the sensitivity denoted ($f_{sensitivity}$) with features $\{X_i\}$ and labels $\{y_i\}$. The performance estimation ML model prediction $p_i=f_{sensitivity}(X_i)$ indicates the sensitivity score of the medical image denoted i, representing the predicted performance for a group of medical images with identical metadata parameters to the calculated medical image denoted $s_i$. Since $\{g_i\}$ are unknown during inference, the inference may be done on all of the test medical image.

To predict sensitivity, the performance for a group of medical images $\{s_{test-i}\}$ with metadata parameters $\{X_{test-i}\}$, the average of the sensitivity scores denoted $<p_i=f_{sensitivity}(\{X_{test-i}\})>$ is computed.

A similar process may be applied for training another performance estimation ML model to predict specificity. Training may be done using $g_i=0$ examples (i.e., other examples such as $g_i=1$ examples are excluded). The labels for specificity are: $y_i=1$ if $c_i=0$ and $y_i=0$ otherwise.

The trained performance estimation ML models may be used to compare different medical image metadata parameters denoted $(X_i,X_k)$ by comparing sensitivity and/or specificity scores, denoted $f_{sensitivity}(X_i)$ versus $f_{sensitivity}(X_k)$ and $f_{specificity}(X_i)$ versus $f_{specificity}(X_k)$. The optimal metadata parameters to achieve the best performance of the computer vision ML model may be found, as described herein.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments in a not necessarily limiting fashion.

Inventors performed experiments to evaluate a performance estimation ML model that generates an estimated performance metric of a computer vision model in response to an input of metadata parameters of medical images. The performance metric obtained from the performance estimation ML model is an estimate of the performance of the computer vision model determined from metadata parameters of the medical images, without actually feeding the medical images into the computer vision model and measuring performance of the computer vision model's inference of the medical images, as described herein.

A training set included several millions of brain CT scans from hundreds of different institutions. Corresponding metadata denoted $\{Xi\}$, predictions by a computer vision ML model that detects intracerebral hemorrhage (ICH) denoted $\{c_i\}$ and ground-truth labels denoted $\{g_i\}$ extracted from reports using NLP.

Referring now back to FIG. 4, table 402 presents a random sample of 10 ground-truth negative examples of metadata used to train the performance estimation ML model. The scores of the computer vision ML model for each scan is provided for demonstration purposes.

Referring now back to FIG. 5, table 502 presents a random sample of 10 ground-truth positive examples of metadata used to train the performance estimation ML model. The scores of the computer vision ML model for each scan is provided for demonstration purposes.

It is noted that as expected, the data is not balanced with average prevalence of 10% with sites specific prevalence in the range 5-20%.

The computer vision ML classifications models were trained for measuring sensitivity and specificity using a classical ML model.

To check the accuracy of the trained computer vision ML model, the leave-one-out method was used. The leave-one-out method is used by training the computer vision ML classification model using all the training data while leaving one of the sites for testing and repeating the process for each of the sites. The predictions of the sensitivity and specificity for each site (average over the sensitivity and specificity scores of each of the site's scans) were compared with the true value that was calculated using the ground-truth labels $\{gi\}$.

The standard deviation of the distribution of errors for the sensitivity and specificity for the sites were calculated. It was found that accuracy of the performance estimation ML model in was about 1% for specificity and about 3% for the sensitivity.

Referring now back to FIG. 6 and FIG. 7, tables 602, 604, 702, and 704, indicate that false positives/negatives have lower specificity scores than true positives/negatives.

In FIG. 6, table 602 presents a random sample of 5 ground-truth negative with negative computer vision predictions. Table 604 presents 5 ground-truth negative with positive computer vision predictions.

In FIG. 7, table 702 presents 5 ground-truth positive with positive computer vision predictions. Table 704 presents 5 ground-truth positive with negative computer vision predictions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant ML models will be developed and the scope of the term ML model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of predicting performance of a computer vision machine learning (ML) model, comprising:
   feeding a plurality of target metadata parameters of at least one target medical image into a performance estimation ML model; and
   obtaining a performance metric of a computer vision ML model as an outcome of the performance estimation ML model,
   wherein the performance estimation ML model is trained on a training dataset comprising a plurality of records, wherein a record is created by:
      feeding a sample medical image into the computer vision ML model,
      obtaining an outcome of the computer vision ML model,
      obtaining a ground truth of the sample medical image corresponding to the outcome,
      extracting a plurality of metadata parameters associated with the sample medical image, and
      wherein the record includes a plurality of metadata parameters associated with the sample medical image and a ground truth label comprising a performance metric of the computer vision ML model computed based on the ground truth of the sample medical image and the outcome.

2. The computer implemented method of claim 1, wherein the at least one target medical image is not fed into the performance estimation ML model, the training dataset excludes medical images, and the at least one target medical image is not fed into the computer vision ML model for predicting the performance of the computer vision ML model.

3. The computer implemented method of claim 1, wherein the at least one target medical image associated with the plurality of target metadata parameters have not yet been captured during computation of the performance metric, and the at least one target medical image is captured after computation of the performance metric.

4. The computer implemented method of claim 1, wherein the at least one target medical image and the sample medical image depict an interior anatomy of subjects, and are captured by a medical image device, wherein the outcome and the ground truth of the sample medical image are a visual medical finding.

5. The computer implemented method of claim 4, wherein the metadata parameters are physical attributes of the subjects.

6. The computer implemented method of claim 4, wherein the metadata parameters are parameters of at least one of: properties of slices of a 3D medical image, a protocol of capturing the medical images, and physical properties of the medical imaging device.

7. The computer implemented method of claim 1, wherein the metadata parameters are selected from a group comprising: fields defined by DICOM® standard, manufacturer of medical imaging device that captured the medical image, model of medical imaging device that captured the medical image, filter type, sex of subject depicted in medical image, age of subject, race of subject, position of subject during acquisition of medical image, whether contrast was administered, and peak kilovoltage (kVp) for x-ray images.

8. The computer implemented method of claim 1, wherein the metadata parameters are non-extractable from the medical image.

9. The computer implemented method of claim 1, wherein the at least one target medical image comprises a plurality of medical images with different combinations of metadata parameters, wherein feeding and obtaining comprise feeding each combination of metadata parameters to obtain a respective intermediate performance metric, and further comprising computing an average of the intermediate performance metrics.

10. The computer implemented method of claim 1, wherein the computer vision ML model is of a plurality of candidate computer vision ML models each associated with a respective corresponding performance estimation ML model, wherein the feeding and the obtaining is performed for each respective corresponding performance estimation ML model of the plurality of candidate computer vision ML models, and further comprising selecting a certain candidate computer vision ML model having a highest performance metric outcome of the respective corresponding performance estimation ML model.

11. The computer implemented method of claim 1, further comprising a plurality of performance estimation ML models each trained for predicting a different performance metric for the computer vision ML model, and further comprising obtaining an input from a user defining a tradeoff between the plurality of performance estimation ML models.

12. The computer implemented method of claim 11, wherein the plurality of performance estimation ML models comprises a first performance estimation ML model for predicting sensitivity and a second performance estimation ML model for predicting specificity, and further comprising providing a graphical user interface (GUI) configured for enabling the user to select the tradeoff between sensitivity and specificity.

13. The computer implemented method of claim 1, further comprising computing an optimal set of metadata parameters, and selecting medical images satisfying the set for feeding into the computer vision ML model.

14. The computer implemented method of claim 13, wherein the optimal set is found by iteratively feeding different combinations of metadata parameters into the performance estimation ML model and identifying the optimal set as a certain combination of metadata parameters having highest performance metric.

15. The computer implemented method of claim 13, further comprising applying a machine learning interpretability process to the performance estimation ML model for identifying at least one most significant metadata parameter that most contributes to the performance metric outcome, and computing values for the at least one most significant metadata parameter that generate the highest performance metric outcome.

16. The computer implemented method of claim 13, wherein the optimal set of metadata parameters includes at least one image acquisition parameter indicating at least one of: image capture protocol, image storage parameter, and an image capture parameter of the medical imaging device, and further comprising generating instructions for adjusting the at least one image acquisition parameter for obtaining the optimal set of metadata parameters in additional images.

17. The computer implemented method of claim 1, wherein the metadata parameters and/or records are represented as tabular data, and the performance estimation ML model is designed for processing tabular data.

18. The computer implemented method of claim 1, wherein the performance metric comprises sensitivity.

19. The computer implemented method of claim 18, wherein the training dataset is created by:
selecting medical images having ground truth of the sample medical image indicating a positive finding depicted in the sample medical image;
setting the performance metric to a value indicating highest performance when the outcome of the computer vision ML model correct identifies the positive finding, or setting the performance metric to a value indicating lowest performance when the outcome of the computer vision ML model fails to correctly identify the positive finding, wherein an average of the performance metric indicates sensitivity of the computer visional ML model for a training benchmark.

20. The computer implemented method of claim 1, wherein the performance metric comprises specificity.

21. The computer implemented method of claim 20, wherein the training dataset is created by:
selecting medical images having ground truth of the sample medical image indicating lack of a positive finding depicted in the sample medical image;
setting the performance metric to a value indicating highest performance when the outcome of the computer vision ML model correct identifies the lack of the positive finding, or setting the performance metric to a value indicating lowest performance when the outcome of the computer vision ML model fails to correctly identifies the lack of positive finding.

22. A computer implemented method of training a performance estimation ML model for estimating performance of a computer vision ML model, comprising:
for each medical image of a plurality of medical images:
feeding the medical image into the computer vision ML model,
obtaining an outcome of the computer vision ML model,
obtaining a ground truth of the medical image corresponding to the outcome, and
extracting a plurality of metadata parameters associated with the medical image;
creating a training dataset comprising a plurality of records, wherein a record of an medical image of the plurality of medical images includes the plurality of metadata parameters and a ground truth label comprising a performance metric of the computer vision ML model computed based on the ground truth of the medical image and the outcome; and
training the performance estimation ML model on the training dataset for estimating a performance of the computer vision ML model for target medical images in response to an input of a plurality of target metadata parameters.

23. A system for predicting performance of a computer vision machine learning (ML) model, comprising:
at least one processor executing a code for:
feeding a plurality of target metadata parameters of at least one target medical image into a performance estimation ML model; and
obtaining a performance metric of a computer vision ML model as an outcome of the performance estimation ML model,
wherein the performance estimation ML model is trained on a training dataset comprising a plurality of records, wherein a record is created by
feeding a sample medical image into the computer vision ML model,
obtaining an outcome of the computer vision ML model,
obtaining a ground truth of the sample medical image corresponding to the outcome,
extracting a plurality of metadata parameters associated with the sample medical image, and
wherein the record includes a plurality of metadata parameters associated with the sample medical image and a ground truth label comprising a performance metric of the computer vision ML model computed based on the ground truth of the sample medical image and the outcome.

* * * * *